United States Patent [19]

Doege et al.

[11] Patent Number: 4,659,278

[45] Date of Patent: Apr. 21, 1987

[54] MANIPULATOR BASED ON THE PANTOGRAPH PRINCIPLE

[75] Inventors: Joachim Doege; Hanns-Dieter Paschke; Ke D. Tran, all of Berlin, Fed. Rep. of Germany

[73] Assignee: Stahl Aufzüge & Co. KG, Fed. Rep. of Germany

[21] Appl. No.: 873,252

[22] Filed: Jun. 5, 1986

Related U.S. Application Data

[63] Continuation of Ser. No. 583,892, Feb. 27, 1984, abandoned.

[51] Int. Cl.⁴ .............................................. B66C 23/04
[52] U.S. Cl. ..................................... 414/680; 414/719; 414/917; 901/48; 248/325
[58] Field of Search ............... 414/680, 744 R, 917, 414/719, 742; 901/14, 17, 48; 248/325

[56] References Cited

U.S. PATENT DOCUMENTS

| | | | |
|---|---|---|---|
| 3,402,911 | 9/1968 | O'Neill | 414/917 X |
| 3,721,416 | 3/1973 | Goudreau | 414/917 X |
| 3,747,886 | 7/1973 | Carlson et al. | 248/325 |
| 3,850,307 | 11/1974 | Motoda | 414/917 X |
| 3,883,105 | 5/1975 | Matsumoto | 414/917 X |
| 3,995,746 | 12/1976 | Osagida | 414/917 X |
| 4,215,972 | 8/1980 | Yamasaki et al. | 414/742 |
| 4,421,450 | 12/1983 | Kouno | 414/719 |
| 4,455,120 | 6/1984 | Richter | 414/719 |

Primary Examiner—Terrance L. Siemens
Attorney, Agent, or Firm—Hill, Van Santen, Steadman & Simpson

[57] ABSTRACT

A mechanism for handling and manipulating a load including a horizontal work beam formed of a parallelogram linkage with a pair of arms interconnected by links. The work beam is pivotally mounted on a retaining part which is adjustably vertically mounted on a rotatable pillar. A counterweight is provided on the work beam for counterweighting its weight. A roller is movable horizontally in a trackway and connected to the work beam with the trackway elevated by a piston and cylinder along the pillar.

8 Claims, 3 Drawing Figures

MANIPULATOR BASED ON THE PANTOGRAPH PRINCIPLE

This is a continuation of application Ser. No. 583,892 filed Feb. 27, 1984, now abandoned.

BACKGROUND OF THE INVENTION

The present invention relates to improvements in load handling mechanisms or manipulators which are used for hoisting, positioning and balancing and for the repetitive handling of workpieces, power tools and the like within a given working space having predetermined dimensions.

More particularly, the invention relates to a load handling device or manipulator which is constructed with a parallelogram linkage which enables movement in a horizontal direction in a very simple manner. In devices of this type, the vertical movement is usually accomplished by means of a cylinder operated with a pressure agent. A pivot bearing enables rotary motion of the load handling device around a vertical axis at a given construction on a floor or on a column or at a given suspension from a ceiling or a carrier. The working space and bearing capacity are changed by means of changing the length of the operative members.

Disadvantages have been encountered in manipulators heretofore available in that their bulkiness has created a problem due to the size and number of arms and members which create difficulties particularly during shipping and assembly. Devices heretofore have utilized double trackways which add costs of manufacture and assembly and also impede maintenance and hamper good accessibility. Examples of structures heretofore available are shown in U.S. Pat. No. 3,259,351 and British Pat. No. 1,434,663.

In accordance with the features of the invention, a horizontal work beam is provided constructed of a parallelogram linkage and the structure is rotatably seated in a retaining part which is releasably secured to a vertical pillar. The work beam is controlled in its movement by a roller which is movable only in a single trackway in a horizontal direction. A parallel arm which is part of the work beam extends past the vertical pillar and is provided with a counterweight to counterweight the weight of the arms and parts. At the opposite side of the pillar from the counterweight and on the side at which the work beam carries the load, is a roller which is movable in a horizontal trackway. The horizontal trackway is elevated by a power piston and cylinder mechanism along the vertical pillar. The work beam is supported by a single pivot point on the retaining part which is vertically adjustable on the pillar. In accordance with the proposed structure, the trackway is supported by a lifting cylinder located below it. The counterweight is adjustable, and in a preferred form is horizontally movable and lockable on one of the parallel arms of the linkage.

It is accordingly an object of the present invention to provide an improved load handling mechanism which is particularly well adapted for manipulatively handling loads within space limitations in a vertical and horizontal direction and which has capabilities of movement vertically, horizontally and rotationally so as to move and manipulate the load in all three dimensions.

A further object of the invention is to provide an improved balanced load handling mechanism which is capable of rapid manipulative handling of loads as well as for repeated manipulative load handling.

A further object of the invention is to provide a load handling mechanism which utilizes parallelogram linkage which is uniquely connected and constructed so as to provide a minimum number of parts and provide improvements over structures heretofore available in both operative and constructional areas. A still further object of the invention is to provide a parallelogram linkage structure for supporting and handling of load at one side of a stand mechanism which has improved capabilities of controllably handling and manipulating such a load.

Other objects, advantages and features will become more apparent from the teaching of the principles of the invention in connection with the disclosure of the preferred embodiments thereof in the specification, claims and drawing, in which:

DESCRIPTION OF THE PREFERRED EMBODIMENTS

Figure 1:
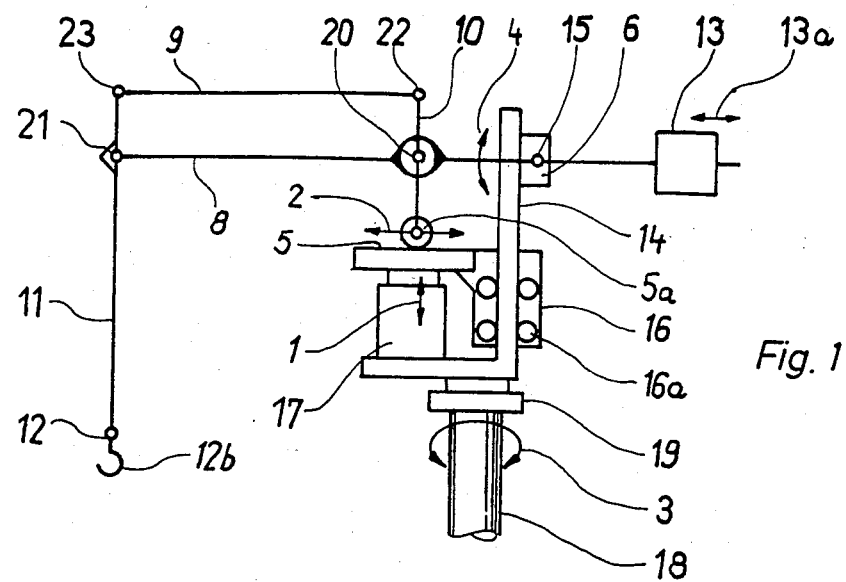
FIG. 1 is a side elevational schematic view showing a load handling device constructed and operating in accordance with the principles of the present invention.

As is illustrated in FIG. 1, the load handling mechanism is carried on a stand 18 which may be in the form of a column mounted on a work floor. It will be understood that the mechanism may be also supported from an overhead arrangement or other support structure.

The load handling mechanism is rotatably supported on the column by a bearing structure 19 so as to be rotatable as shown by the arrowed arcuate line 3. Rotational control on the bearing 19 is not power driven.

Mounted on the column is a vertical pillar 14. Supported on the vertical pillar is a horizontal work beam which includes horizontally extending parallel arms 8 and 9 with the lower arm 8 extending past the pillar 14 and pivotally mounted at 15 on a retaining part 6 which is vertically adjustable on the vertical pillar 14. The horizontal work beam has pivotal movement as shown by the double arrowed line 4.

To the right of the vertical pillar 14 and to the right of the pivotal support 15 is a horizontally adjustable counterweight 13 which is lockable to the arm 8 and which is adjustable horizontally as shown by the arrowed line 13a. The counterweight is adjustable horizontally to counter-balance the pivotal weight of the parallel arms 8 and 9 and the associated linkage.

The parallel arms 8 and 9 are interconnected by links at each end with the link at the left end shown connected at pivot points 21 and 23 to the parallel arms 8 and 9 respectively. At the right side of the parallel arms is a link or lever 10 which is pivotally connected at its upper end 22 to the parallel arm 9 and at an intermediate point 20 to the arm 8. The lever 10 extends downwardly, and at its lower end carries a roller 5a which moves horizontally in a trackway 5 as indicated by the arrowed line 2. The roller 5a is allowed to move freely on the trackway 5. The single trackway on which the roller moves extends horizontally and is supported on a piston and cylinder mechanism 17 for vertical movement. To guide the trackway vertically, rollers 16a in a carriage 16 move up and down along the vertical pillar as the piston and cylinder 17 are operated to controllably elevate the trackway 5. The piston and cylinder are rigidly supported on the lower L-shaped end of the pillar 14.

At the load end of the work beam is a depending vertical work arm 11 which has pivotally connected at 12 a load securing hook 12b.

In operation of the structure of FIG. 1, vertical movement of the load connected to the hook at 12b is attained by the piston and cylinder 17 which move up and down to move the trackway 5 up and down and the beam will pivot vertically about its pivot point 15 accordingly. Horizontal movement in a rotary direction is achieved by rotation of the assembly on the vertical stand or column 18. Movement of the roller 5a and movement of the bearing 19 takes place by moving, by hand, any point of the end of the vertical arms 28 and 11, for example, by moving the load which on part 30 in FIG. 2, or the hook which is at 12b in FIG. 1.

The L-shaped bracket 6 always remains at a fixed chosen position on the pillar 14 and is only loosened or removed for transport or change of linkage.

Figure 2:
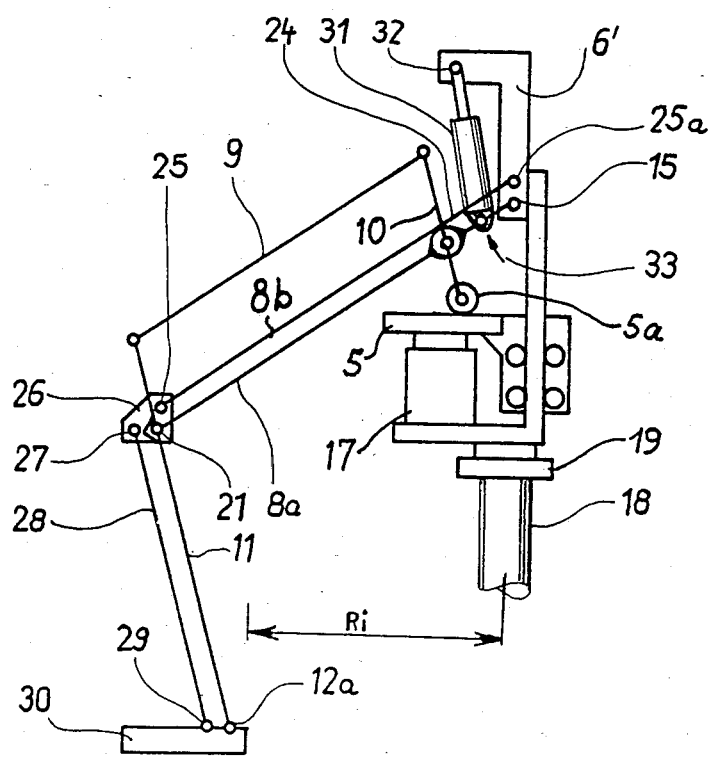
FIG. 2 is another side elevational schematic showing a modified form of the structure.
Figure 3:
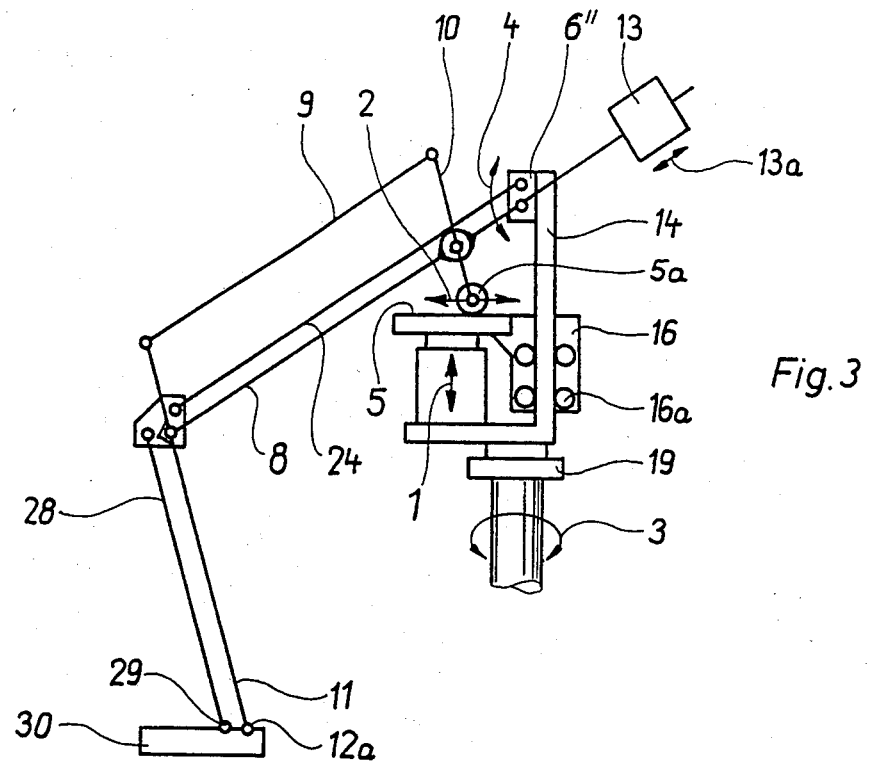
FIG. 3 is a side elevational view shown in somewhat schematic form of still another form of structure embodying the principles of the invention.

While each of the arrangements of FIGS. 1, 2 and 3 offers advantages in certain environments, FIG. 3 is the preferred form for the majority of environmental uses.

A feature of the structure of FIG. 1 is that the ratio of distances referred to as "i" of the pivotal centers from 15 to 20 to 15 to 21 is equal to the ratio of the distances of 20 to 5a to 21 through 12. The pivotal bearing centers of 12, 5a and 15 are disposed in a straight line.

Referring to FIG. 2, similar parts relative to FIG. 1 are given similar numbers, and the mechanism is carried on a stand 18 rotatably mounted by a bearing 19. Mounted at the upper end of the pillar 14 is an inverted L-shaped bracket 6'. At the top leg of the bracket, is connected a counter-balanced piston and cylinder 31 connected at 32 to the bracket. The structure has upper and lower arms 9 and 8a with the inner end of 8a connected at 15 to the lower end of the bracket. Another arm 8b parallel to 8a is pivotally connected at 25a to the bracket 6. At the right end of the drawing, the lever 10 connects to a roller 5a at its lower end which moves in a trackway 5 similar to the structure of FIG. 1, and the structure also rotates on the pillar 14 in the same manner as FIG. 1.

At the left end of the load handling horizontal work beam including the arms 8a, 8b and 9, the arm 8a is pivotally connected at 27 to a guide plate 26. The arm 8b is pivotally connected at 25 to the guide plate 26. The downwardly extending work arm 11 is also connected pivotally to the guide plate and at its lower end is connected to a load carrying extension 30 at 12a. Another downwardly extending work arm 28 is pivotally connected at 27 at its upper end to the guide plate 26, and at its lower end at 29 to the extension 30. The extension may be provided with a work connecting hook at its projecting end shown to the left in FIG. 2. Movement of the arms as the load is lifted is shown by the arrowed line 33.

Referring back to FIG. 1 with a movement in the direction of the arrowed line 2, the height for the roller 5a and the point 12 are not changed and thus no force is required except overcoming the friction and the mass inertia of the moving parts. Thus, the friction is lower than given a structure with two trackways which has a double fit produced torsions and must be very precisely manufactured and assembled. As a result of the provision of the lifting cylinder 17 below the trackway 5, the forces acting on the equipment guide are reduced thus enabling a precise parallel guidance of the trackway 5. This disposition of the trackway 5 and the lifting cylinder 17 limits the working space of the manipulator toward the center, but this in turn is compensated for by the disposition of the parallel arms on the other side of the vertical pillar. The distance of the end of the work arm 11 is shown in FIG. 2 by the distance Ri which is the distance from the arm to the center of the bearing 19.

In the arrangement of FIG. 2, the effect of the weight of the arms which comprise the horizontal work beam is counter-balanced by the counter-balancing cylinder 31 which is charged with a pressurized gas.

In the arrangement of FIG. 3, the work beam is shown including parallel arms 8, 24 and 9. The upper ends of arms 8 and 24 are pivotally connected to a retaining part 6" which is mounted on the vertical pillar 14. In the arrangement illustrated, the counter-balancing weight 13 which is adjustably movable in the direction indicated by the arrowed line 13a is provided on an extension of the parallel arm 8 in a manner similar to the structure of FIG. 1. Otherwise, the structure of FIG. 3 resembles in construction and operation the structure shown in the modification of FIG. 2.

Thus, it will be seen that we have provided an improved load handling mechanism and manipulator which meets the objectives and advantages above set forth and which is essentially simple in construction and yet capable of carefully and manipulatively handling a load.

We claim as our invention:

1. A load handling mechanism comprising in combination:
    a work beam structure having a proximal end and a distal end and including a pair of parallel arms pivotally interconnected by a pair of parallel pivotal links;
    a vertical pillar including an upper end with said proximal end of said work beam structure mounted thereon at said upper end;
    a trackway supported by said pillar;
    one of said links including a link extension having a distal end extending beyond its pivotal connection to said arms;
    a roller connected to said distal end of said one link for rolling on said trackway;
    a guide mounted at said distal end of said work beam structure;
    vertical arm means including an upper end connected to said guide, and a lower end, the other of said links rigidly connected to said vertical arm means; and
    load connecting means at said lower end of said vertical arm means for connecting a load.

2. The load handling mechanism of claim 1, wherein: said vertical arm means comprises a pair of vertical arms.

3. The load handling mechanism of claim 1, wherein: said connecting means for connecting to a load includes a horizontal extension pivotally connected to said lower end of said vertical arm means.

4. The load handling mechanism of claim 1, and further comprising:
    a movable counterbalance means connected to said work beam structure and adjustable for controllably varying the counterbalance force applied to said work beam structure.

5. The load handling mechanism of claim 4, wherein: said counterbalance means is in the form of a piston and cylinder mechanism.

6. The load handling mechanism of claim 1, and further comprising:
   a third work beam arm pivotally connected to said guide and to said vertical pillar.

7. The load handling mechanism of claim 6, and further comprising:
   a counterbalance means applying a vertical force on said third work beam arm.

8. A load handling mechanism comprising in combination:
   a vertical pillar;
   a horizontally extending work beam pivotally mounted at a first pivot point on said vertical pillar;
   a downwardly extending lever pivotally connected to said work beam at a second pivot point;
   a roller rotatably connected to the lower end of said downwardly extending lever and having an axis of rotation defining a third pivot point;
   a horizontal trackway supported by said vertical pillar and supporting said roller; and
   a downwardly extending work carrying arm connected at a fourth pivot point to said work beam and to a load at a fifth pivot point,
   the ratio of distances between said first and second pivot points and said first and fourth pivot points being the same as the ratio of the distances between said second and third pivot points and the distance between said fourth and fifth pivot points.

* * * * *